United States Patent [19]
Jewell et al.

[11] Patent Number: 6,111,708
[45] Date of Patent: Aug. 29, 2000

[54] APPARATUS AND METHOD FOR DETECTING READ/WRITE GAP FAILURE AND SWITCHING TO AN ALTERNATIVE READ/WRITE GAP

[75] Inventors: Gregory Steven Jewell, LaFayette; Charles Daniel White, Jr., Longmont, both of Colo.

[73] Assignee: Tecmar Technologies, Inc., Longmont, Colo.

[21] Appl. No.: 08/763,394

[22] Filed: Dec. 11, 1996

[51] Int. Cl.[7] .................................................. G11B 27/36
[52] U.S. Cl. ................................ 360/31; 360/53; 360/63
[58] Field of Search ................................ 360/31, 53, 61, 360/62, 63, 54, 121; 324/210

[56] References Cited

U.S. PATENT DOCUMENTS

| | | | |
|---|---|---|---|
| 4,063,293 | 12/1977 | Perahia | 360/62 |
| 4,500,965 | 2/1985 | Gray | 364/400 |
| 4,685,005 | 8/1987 | Fields, Jr. | 360/53 |
| 4,700,242 | 10/1987 | Namiki | 360/68 |
| 4,743,985 | 5/1988 | Shibata et al. | 360/61 |
| 5,253,128 | 10/1993 | Ike et al. | 360/64 |
| 5,353,176 | 10/1994 | Kosuge | 360/63 |
| 5,357,379 | 10/1994 | Gower | 360/46 |
| 5,369,652 | 11/1994 | Bailey et al. | 360/53 X |
| 5,381,277 | 1/1995 | Jaffard et al. | 360/62 |
| 5,392,170 | 2/1995 | Solhjell | 360/53 X |
| 5,438,462 | 8/1995 | Copolillo | 360/53 |
| 5,483,390 | 1/1996 | Jaffard et al. | 360/62 |

OTHER PUBLICATIONS

QIC Development Standard, "Serial Recorded Magnetic Tape Minicartridge for Information Interchange", Revision B, Dec. 13, 1995, pp. 39–40 and 44–45.

QIC Development Standard, "Magnetic Head for Use with 4.0 GB TR 4 QIC–3095–MC Recording Format", Revisioin B, Jun. 20, 1996, pp. 4, 14 and 15.

*Primary Examiner*—Andrew L. Sniezek
*Attorney, Agent, or Firm*—Swanson & Bratschun, LLC

[57] ABSTRACT

A magnetic storage device for storing and retrieving data from a magnetic medium such as a magnetic tape. The magnetic storage device includes a first write gap, a first read gap and at least one of a second write gap and a second read gap with each gap operatively associated with the magnetic medium. A controller is coupled to each gap. The controller senses an error from a gap and stores an error flag.

32 Claims, 6 Drawing Sheets

APPARATUS AND METHOD FOR DETECTING READ/WRITE GAP FAILURE AND SWITCHING TO AN ALTERNATIVE READ/WRITE GAP

BACKGROUND OF THE INVENTION

1. Technical Field

The present invention is related generally to magnetic back up and recovery systems and specifically to a tape drive having redundant read and write gaps.

2. Background Art

Digital data tape recorders for backing up and restoring data in a computer system have been in use for many years. Such systems back up data in either a write only mode or a read while write mode. The read while write mode permits virtually instantaneous verification of recorded data while the write only mode typically requires the integrity of data to be verified by reading the tape after completion of a back up or write operation. The write only mode requires only a single write gap and a single read gap or in some instances a single head having read and write capability. The read while write mode requires a storage device having a read gap which trails a write gap relative to the direction of tape movement. Generally, only a single read gap is required for restoring data.

A significant problem with known magnetic storage devices is that in the event of a failure of a read or write gap used during a read or write operation, the storage device controller declares a hardware failure and the read or write operation is terminated without completion. This can be a significant problem when scheduled back ups or restores cannot be completed resulting in delays in using or perhaps even breakdowns in a computer system.

The present invention is directed to overcoming one or more of the problems discussed above.

SUMMARY OF THE INVENTION

The first aspect of the present invention is a magnetic storage device for storing and retrieving data from a magnetic medium such as a magnetic tape. The magnetic storage device includes a first write gap, a first read gap, and at least one of a second write gap and a second read gap, with each gap operatively associated with the magnetic medium. A controller is coupled to each gap. The controller senses an error from a gap and stores an error flag.

In one embodiment the magnetic storage device has first and second read gaps and write gaps and the error is one of a bad read gap error and a bad write gap error. When the error is a bad write gap error, a write gap error flag is stored and the controller switches between the first and second write gaps. When the error is a bad read gap error, a read gap error flag is stored and the controller switches between the first and second read gaps.

In another embodiment the magnetic storage device having first and second read and write gaps is normally operable in a read while write mode during storage of data. In a first direction of the magnetic medium, the first write gap writes data and the first read gap reads the just written data and in a second direction of the magnetic medium the second write gap writes data and the second read gap reads the just written data. When the controller senses a bad write gap error, the current write gap is flagged bad and the controller switches to the other write head. When the controller senses a bad read gap error, the current read gap is flagged bad.

In a further embodiment, while operating in a read while write mode, upon sensing an error, the controller causes reread of a last written block of data and senses a bad read gap error if the last written block of data cannot be reread and a bad write gap error if the last written data can be reread. The bad read or write gap flag is stored in memory, the device switches to the other read or write gap and back up continues in a write only mode. Preferably, all the gaps are contained in a single head and all the gaps are in the same longitudinal plane.

Another aspect of the present invention is a method of operating a magnetic storage device. The method includes selecting a mode of operation and determining when an error has occurred. When the mode of operation is a read mode, it is determined whether a read gap that has not been flagged bad is available. If so, a read gap bad flag is set on the current read gap and the device switches to an alternate read gap which has not been flagged bad. If no read gap that has not been flagged is available, a hardware failure is declared. When the mode of operation is in a read while write mode, a determination is made whether a current write gap or a current read gap is bad and the bad gap is flagged. When the current write gap is flagged bad, a switch is made to an alternate write gap, if available.

Another aspect of the present invention is a computer-readable storage medium containing computer-readable instructions that when executed by a computer connected to a magnetic storage tape drive, performs the steps of selecting a mode of operation, determining when an error has occurred, when the mode of operation is a read while write mode, determining when a write gap causes the error, setting a gap bad flag on the current write gap and switching from the current write gap to an alternate write gap.

Yet another aspect of the invention is a tape drive for storing and retrieving data from a select track of magnetic medium. The tape drive includes a first read/write head and a second read/write head with the first read/write head receiving a write electric signal and in response to the write electric signal writing data by producing flux changes in a select track of the magnetic medium along the first direction of the magnetic medium and second read/write head reading data by sensing flux changes along the first direction of the magnetic medium during a read while write mode of operation and producing a read electric signal in response to the flux changes, with the first and second read/write heads switching read and write functions along a second direction of the magnetic medium. A controller is electrically coupled to each of the first and second read/write heads. The controller detects an error in the read electric signal and repositions the magnetic medium before the last known block of written data in response to the error signal. A read error signal is produced by the controller if the last known block of written data cannot be reread and a write error signal is produced if the last known block of written data can be reread. In response to a read error signal the controller puts the device in a write only mode and continues to write data and in response to a write error signal the controller puts the device in a write only mode, switches the write function from current read/write head to the other read/write head and continues writing data.

The magnetic storage device or tape drive of the present invention provides a tape head having multiple read and write gaps, a way to detect failure of a gap and a way to switch to an alternate gap so as to continue a restore or back up operation without declaring a hardware error. By providing redundant read and write gaps and a way to switch to an alternate read or write gap without halting the back up or restore operation, the present invention markedly increases the reliability of the magnetic storage device at minimal cost. This is particularly true where the storage device is operable in a read while write mode in forward and reverse tape directions since a read and write gap pair is required for each direction of tape movement.

DETAILED DESCRIPTION OF THE PREFERRED EMBODIMENT

The apparatus and method for detecting read/write gap failure and switching to an alternate gap described below has particular utility in tape formats where the tape drive may operate in a read mode, a write only mode and a read while write mode. One example of such a format is the TRAVAN 4 standards of the QIC Committee, which are incorporated by reference herein. The TRAVAN 4 standards permit tape drives to back up data in either a write or read while write mode. Obviously, while in the read while write mode, data is verified as it is written. In the write only mode, written data is verified, if at all, only after completion of a back up operation.

Figure 1:
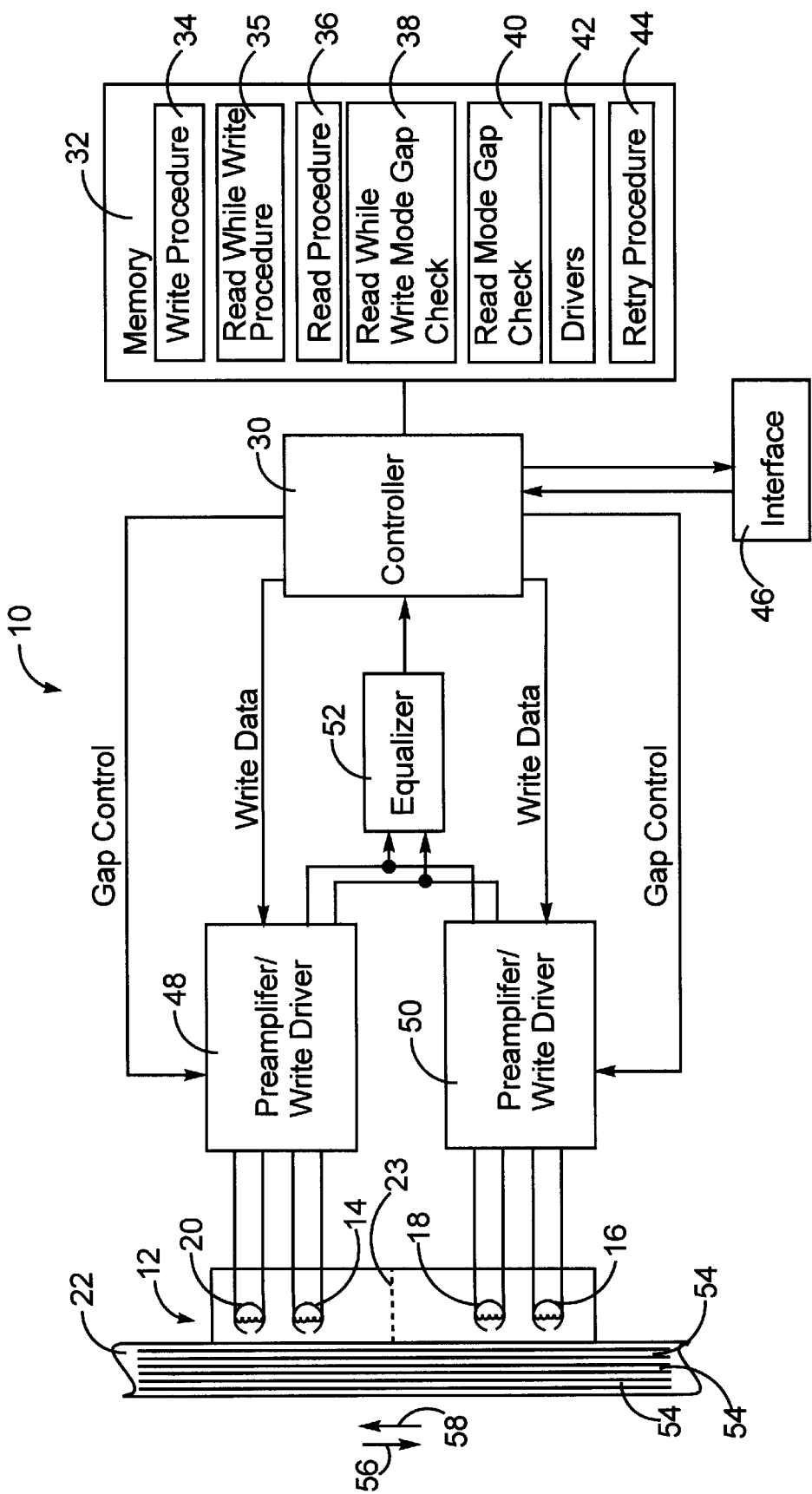
FIG. 1 is a logical block diagram of a tape drive having a tape head with two pairs of read and write gaps and including a controller capable of detecting and flagging gap errors and switching between read or write gaps of the read and write gap pairs in order to complete a back up or restore operation.

FIG. 1 is a logical block diagram of a read/write circuitry 10 of a tape drive including the present invention. The circuitry 10 includes a read/write head 12 having a first write gap 14, a first read gap 16, a second write gap 18 and a second read gap 20. The write gaps 14, 18 operate to produce flux changes onto a tape 22 during a back up operation and the read gaps 16, 20 sense flux changes on the tape 22 during a read or read while write mode of operation. The dotted line 23 illustrates that the 4 gap read/write head 12 could be replaced by two heads, the first head having the first write gap 14 and the second read gap 20 and the second head having the second write gap 18 and the first read gap 16. Alternatively, each gap could be part of a separate head.

In the preferred embodiment illustrated in FIG. 1, the read and write gaps are configured read 20, write 14, write 18, read 16. Alternatively, the gaps could be configured write 20, read 14, read 18, write 16 or read write read write.

The circuitry 10 also includes a controller 30 which operates to control the back up and restore operations of the tape drive. The controller 30 controls these operations by executing instructions stored in a memory 32. These instructions can be divided logically into different procedures, such as a write procedure 34, a read while write procedure 35, a read procedure 36, a read while write mode gap check procedure 38, a read mode gap procedure 40, several drivers 42 and a retry procedure 44. The drivers 42 includes, for example, a driver which controls a mechanism such as a motor for moving the tape 22 longitudinally in a first or second direction relative to the read/write head 12, a driver for controlling another mechanism such as a motor for moving the read/write head 12 in a direction perpendicular to the direction of movement of the tape 22 and a driver for controlling which read and write gap is reading or writing data in a particular mode of operation during a particular direction of tape movement relative to the read/write head 12.

Data input into and data output from the tape 22 are communicated to an associated computer (not shown) through a conventional interface 46.

As in conventional tape drives, data to be backed up or written onto the tape 22 are encoded by the controller 30 using a known technique. The coded signal is transmitted to one of the first and second preamplifier/write drivers 48, 50 which produces a write electric signal energizing an associated first write gap 14 or second write gap 18 to produce flux changes on a magnetic coding of the tape 22. The write operation is performed by the controller 30 executing the write procedure 34 stored in the memory 32.

When the first and second read gaps 16, 20 are reading data, flux changes recorded on the tape 22 are sensed by one of the first and second read gaps 16, 20 (depending on the direction of the tape movement). The read gaps 16, 20 produce a read electric signal in response to the flux changes. The read electric signal is applied to one of the first and second associated preamplifier/writer drivers 48, 50. The amplified signal is then applied to an equalizer 52 and the signal is then applied to the controller 30. The controller 30 separates the electric signal into a data signal and a clock signal. The data signal is then sent to an error-detector which checks the integrity of the data signal in a manner that will be described in greater detail below. While operating in a read mode, if the data signal indicates an error, the retry procedure 44 is called up to a select number of times before read mode gap check procedure 40 is called. During a read while write mode of operation, upon detection of an error signal the retry procedure 44 is called a select number of times and upon an inability to generate a proper read signal, the read while write mode gap check procedure 38 is called.

The tape 22 has a plurality of longitudinal tracks 54. The tape is written in a serpentine mode, meaning that the tape driver must be able to write in both the first direction indicated by the arrow 56 and the second direction indicated by the arrow 58. When data is written in the first direction 56, the first write gap 14 and the first read gap 16 form a first read/write gap pair. When operating in a read while write mode, flux changes created on longitudinal tracks 54 of the tape 22 by the first write gap 14 are detected by the first read gap 16. Likewise, when the tape is run in the second direction indicated by the arrow 58, the second write gap 18 and the second read gap 20 function as a read/write pair so that in the read while write mode, the read gap 20 detects flux changes imparted on a select track 54 of the tape 22 at a second write gap 18. In the preferred embodiment of the present invention, each of the first write gap, first read gap, second write gap and second read gap all lie on the same longitudinal plane so that each is operatively associated with a single select longitudinal track 54 during a read, write or read while write mode of operation. Such a structure is required so that, as discussed below, in the event of failure of one of the gaps during a back up or restore operation, the other read or write gap can be used to complete the back up or restore operation.

Figure 2:
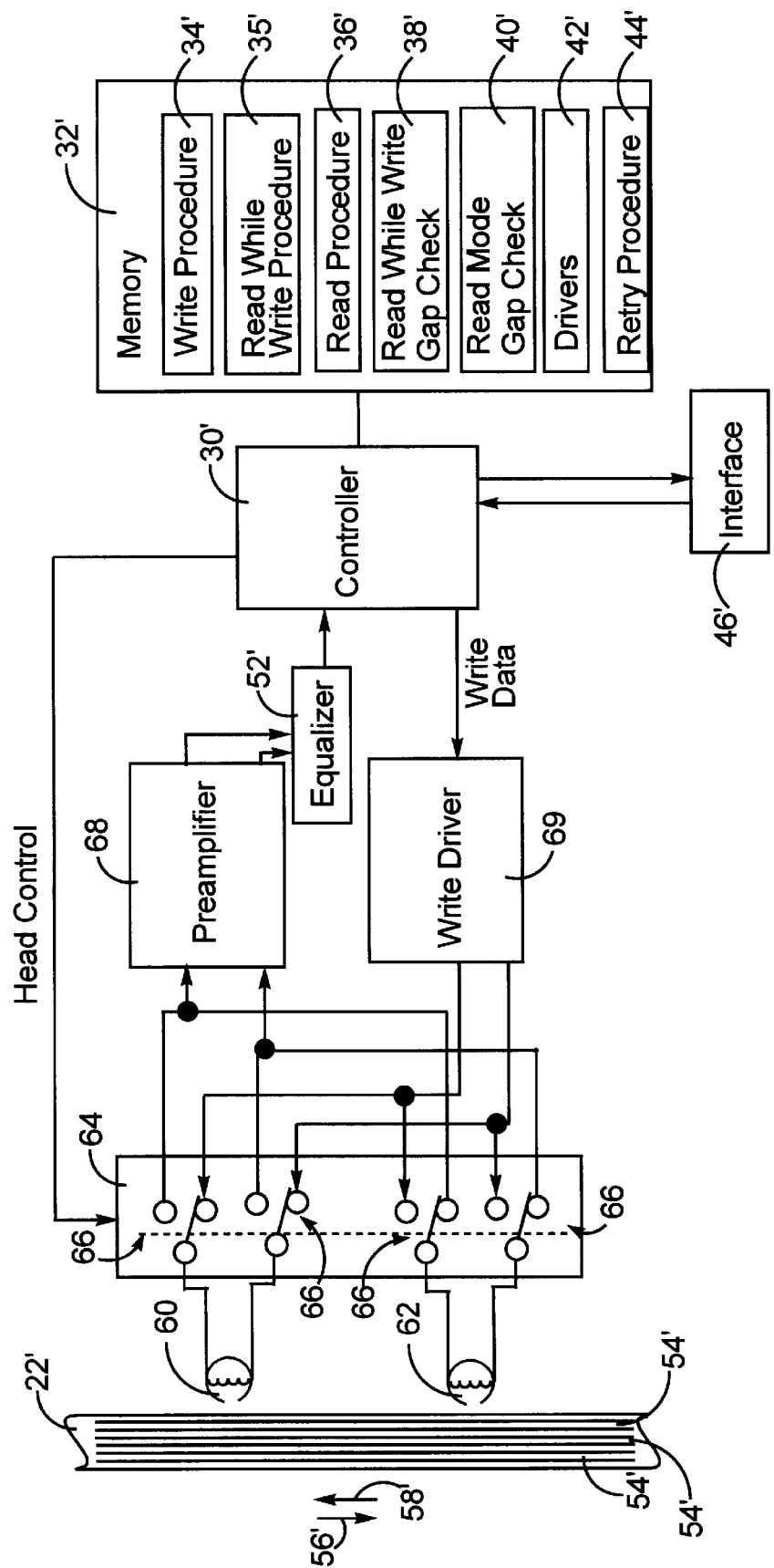
FIG. 2 is a logical block diagram of a tape drive having two read/write heads with each being capable of switching between a read and a write function and a controller capable of detecting an error in the read/write heads and switching a function between a failed read/write head and the other read/write head to continue a back up or restore operation.

FIG. 2 is a second embodiment of the invention wherein the single head 12 having two pairs of read and write gaps is replaced by a first read/write head 60 and a second read/write head 62. Each of the first and second read/write heads 60, 62 are connected to a mux 64 having a plurality of switches 66 for making connections between the read/write heads 60, 62 and a preamplifier 68 and a write driver 69. Using this set up, the read/write heads 60, 62 can switch between a read head function and a write head function by actuations of the switches 66 within the mux 64. The apparatus is in all other aspects the same as the embodiment illustrated in FIG. 1 and therefore identical reference numbers including a prime (') are used in FIG. 2 and the description of the components is the same as that provided above. When the embodiment illustrated in FIG. 2 operates in a read while write mode during the first direction 56 of tape movement, the first read/write head 60 operates as a write gap and the second read/write head 62 operates as a read gap to detect flux changes in a select track caused by the write gap 60. This configuration is illustrated in FIG. 2. When the tape moves in the second direction indicated by the arrow 58, the function of the first and second read/write heads switches and each of the switches 66 changes connections to implement the change in function.

Figure 5:
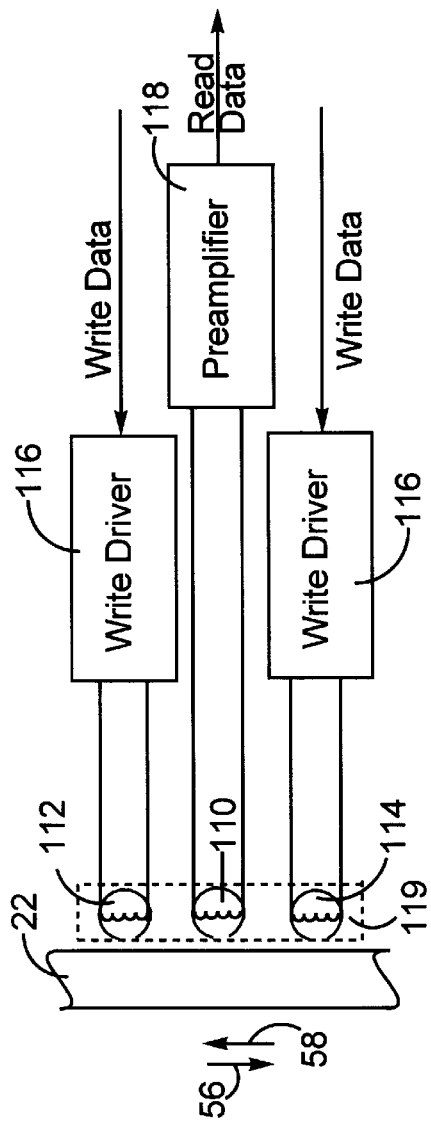
FIG. 5 is an alternate embodiment of FIG. 1 having two write gaps and one read gap.
Figure 6:
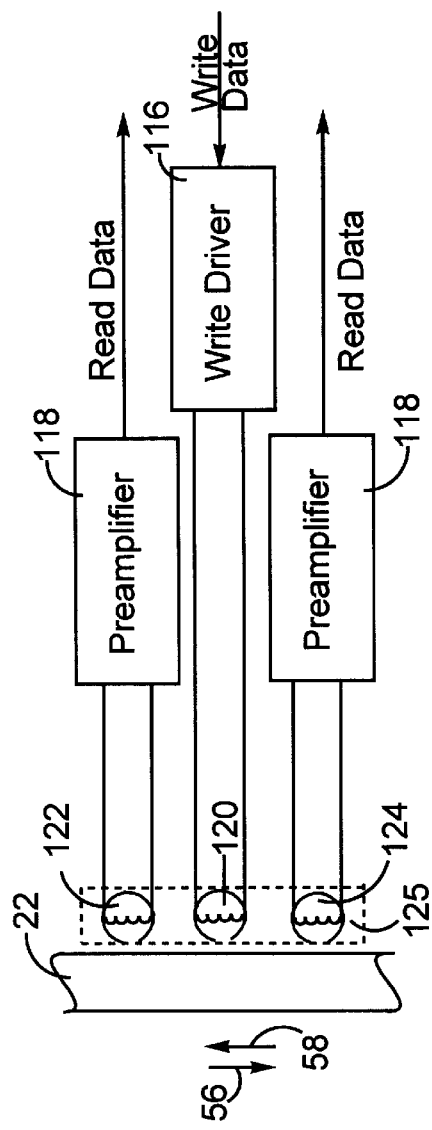
FIG. 6 is an alternate embodiment of FIG. 1 having two read gaps and one write gap.

FIGS. 5 and 6 show portions of third and fourth closely related embodiments of the invention. In the third embodiment illustrated in FIG. 5, a read gap 110 is sandwiched between first and second write gaps 112 and 114. In the same manner discussed above with respect to FIG. 2, each write gap 112, 114 is connected to a write driver 116. FIG. 5 illustrates separate write drivers 116, but a single write driver 116 could be substituted. The read gap 110 is connected to a preamplifier 118. The preamplifier 118 and the write drivers 116 are connected to a controller in the same manner illustrated in FIGS. 1 and 2. In a read while write mode of operation during the first direction 56 of tape movement, the first write gap 112 writes data and the read gap 110 detects the just written flux changes (i.e., verifies the data). During the second direction 58 of tape movement, the second write gap 114 writes data and the read gap 110 verifies the just written data. The phantom box 119 illustrates that the three gaps 100, 112, 114 could be part of a single head 119 or each could be a stand alone read head or write head. Of course, a single head could also include any two of the three heads.

In the fourth embodiment illustrated in FIG. 6, a write gap 120 is sandwiched between first and second read gaps 122, 124. The write gap is connected to a write driver 116 and the read heads are connected to preamplifiers 118. Again, a single preamplifier 118 may be used. In all other respects, this embodiment is identical to FIG. 1. While in a read while write mode, in the first direction 56 of tape movement the second read head 124 verifies data and in the second direction 58 of tape movement the first read head 112 verifies data. The phantom box 125 illustrates, as discussed above with respect to FIG. 5, that the gaps 120, 122, 124 can be part of one or more heads.

Figure 3:
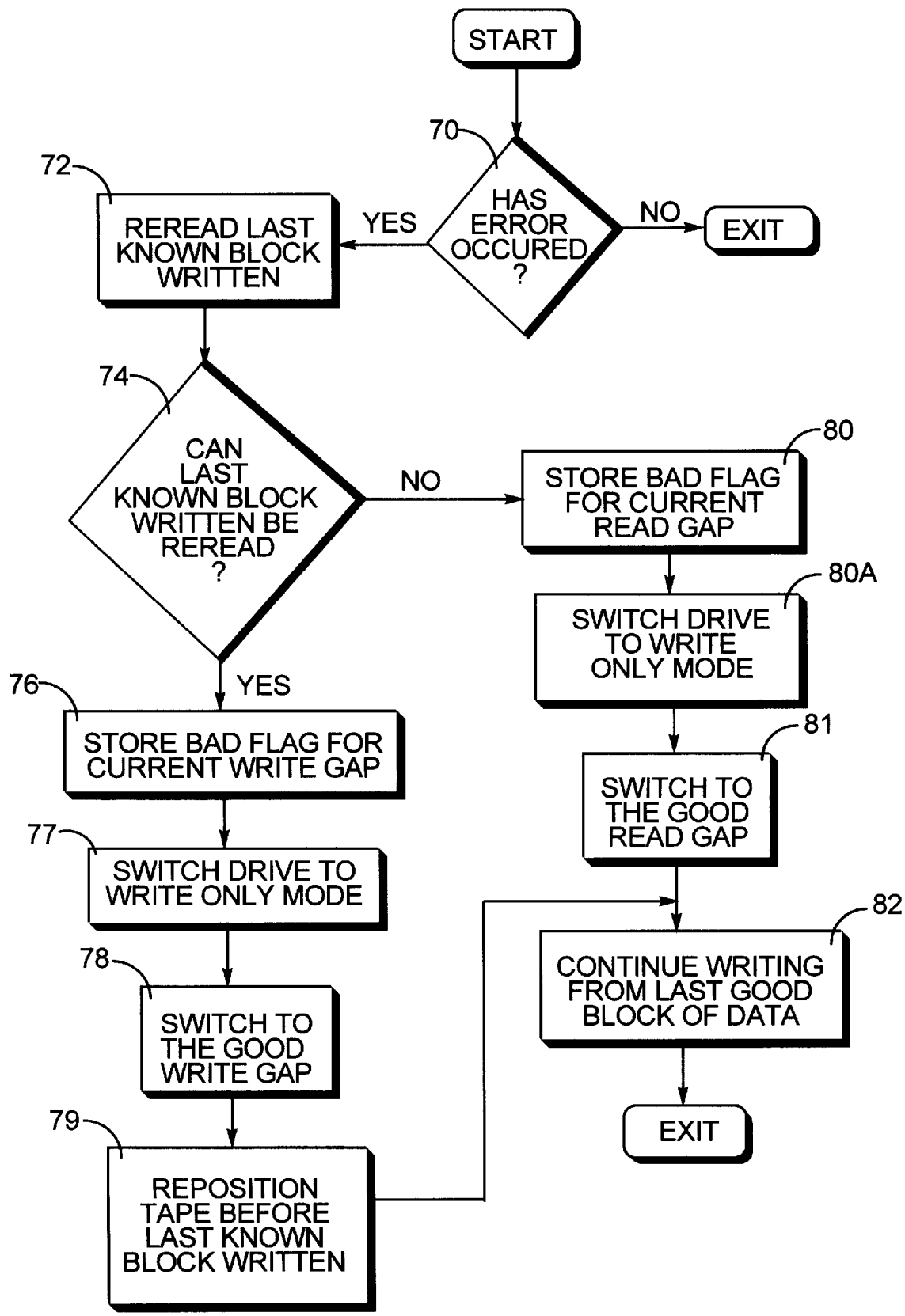
FIG. 3 is a flow chart showing the logical steps of checking for a bad gap and switching gap while in a read while write mode.

The logical steps performed by the read while write gap check procedure 38 are shown in the flow chart of FIG. 3. When the read while write gap check procedure is entered, at decision block 70 it is determined whether an error has occurred. Determination of whether an error has occurred is made by detecting an error in the read signal. In a read while write mode, such an error is a failure of the read gap of a read/write gap pair to detect just written data. An error in the read signal can only be detected after the retry procedure 44 has failed to correct any detected error. If during a select number of retries the error no longer occurs, the procedure is exited. If after the select number of retries the error still occurs, the routine continues at block 72. At block 72 a reread of the last known block of written data is implemented. The reread is implemented by rewinding the tape to the last known block of written data and rereading the tape using the current read head. At decision block 74 it is determined whether the last known written block can be reread. If the last known block of data can be reread, this is indicative of a failure of a write gap and the procedure continues at block 76. At block 76 a bad flag for the current write gap is generated and stored. At block 77 the controller is caused to switch from the read while write mode to the write only mode. At block 78 the driver 42 is caused to switch to the good write gap and at block 79 the driver 42 is instructed to reposition the tape before the last known block written. Block 82 then implements the write procedure 34 in write only mode beginning after the last good block of data.

If at decision block 74 the last known block of data could not be reread, this is indicative of a read gap failure. At 80 a bad flag is stored for the current read gap and at block 80A the controller switches to a write only mode. At block 81 the driver procedure 42 is called to switch to the good read gap. The procedure continues at block 82 where the write procedure 34 is called to continue writing data in the write only mode.

The write gap check procedure 38 will work as described with the hardware embodiments illustrated in FIGS. 1 and 2. The embodiment of FIG. 1 has two pairs of read and write gaps and the embodiment of FIG. 2 effectively has two pairs of read and write gaps as each read/write head can switch read and write functions. The gap check procedure 38 requires slight modification to work with the three gap embodiments illustrated in FIGS. 5 and 6. With the two write gap, one read gap embodiment of FIG. 5, blocks 80 and 81 cannot be performed because there is no alternate read gap. Thus, these blocks would be eliminated from a read while write gap check procedure for this embodiment. Instead, a hardware failure would be declared if the last known block of written data could not be reread at decision block 74. With the two read gap, one write gap embodiment of FIG. 6, block 76, 78, 79 cannot be performed because there is no alternate write gap. Thus, these logical steps would be eliminated from a read while write gap check procedure and a hardware failure would be declared if at decision block 74 the last known block of written data could be reread.

Operation of a tape drive in a read while write mode always requires a read gap trailing a current write gap to verify the just written data. It should be noted that read 20, write 14, write 18, read 16 gap configuration illustrated in FIG. 1 would have a read gap trailing the current write gap following a write gap error and switching to the alternate write gap. Thus, the read while write gap check procedure could provide that upon failure of a write gap and a switch to the alternate write gap the storage device continues in a read while write mode. It has been found that this was not feasible in the preferred embodiment because the physical proximity of the new write head and the trailing read head leads to cross-talk interference. Thus, the read while write mode gap check procedure 38 contemplates switching to a write only mode upon failure of current read or write gap. However, because the cross-talk interference problem could be eliminated by isolating the adjoining first write gap 14 and second read gap 20 and second write gap 18 and first read gap 16 from such interference, it is contemplated that the read while write mode gap check procedure 38 illustrated in FIG. 3 could be modified to provide that in the event of a bad write gap, that a switch is made to the alternate write gap and the back-up continues in a read while write mode. Similarly, if the gaps 14, 16, 18, 20 illustrated in FIG. 1 were configured write read read write, the procedure 38 could provide back-up continues in a read while write mode upon failure of a read gap and a switch to the other trailing read gap if the alternate read gap is isolated from the cross-talk interference. Finally, if the gaps 14, 16, 18, 20 of FIG. 1 were configured read 20, write 14, read 18, write 16, in the second direction of tape movement 58 back-up could continue in a read while write mode upon failure of either of a read or write gap, while in the first direction of tape movement 56 back-up would have to switch to write only upon failure of either of a current read or write gap.

Figure 7:
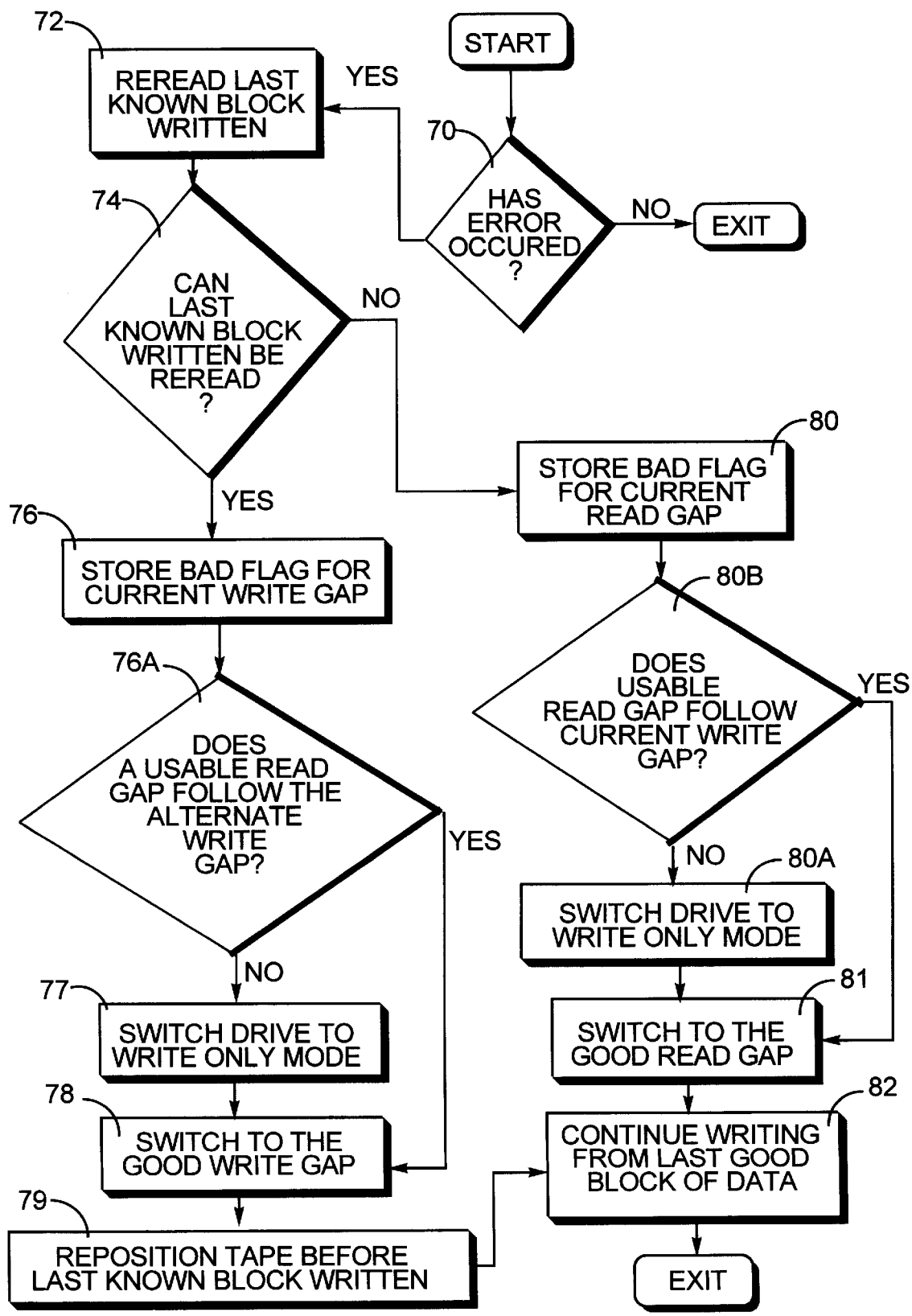
FIG. 7 is an alternate embodiment of the flow chart of FIG. 3.

To implement such embodiments, the read while write gap procedure 38 of FIG. 3 would simply have to be modified as illustrated in FIG. 7. All blocks with identical reference numbers in FIG. 7 are identical in function to those of FIG. 3 discussed above. In FIG. 7 decision block 76A is added where it is determined if a usable read gap follows the alternate write gap. If so, the procedure continues at block 78 in a read while write mode. If not, at block 77 the controller switches the drive to a write only mode. Decision block 80B is added where it is determined if a usable read gap follows the current write gap. If so, the procedure continues at block 81 in a read while write mode. If not, at block 80A the controller switches the drive to a write only mode.

Figure 4:
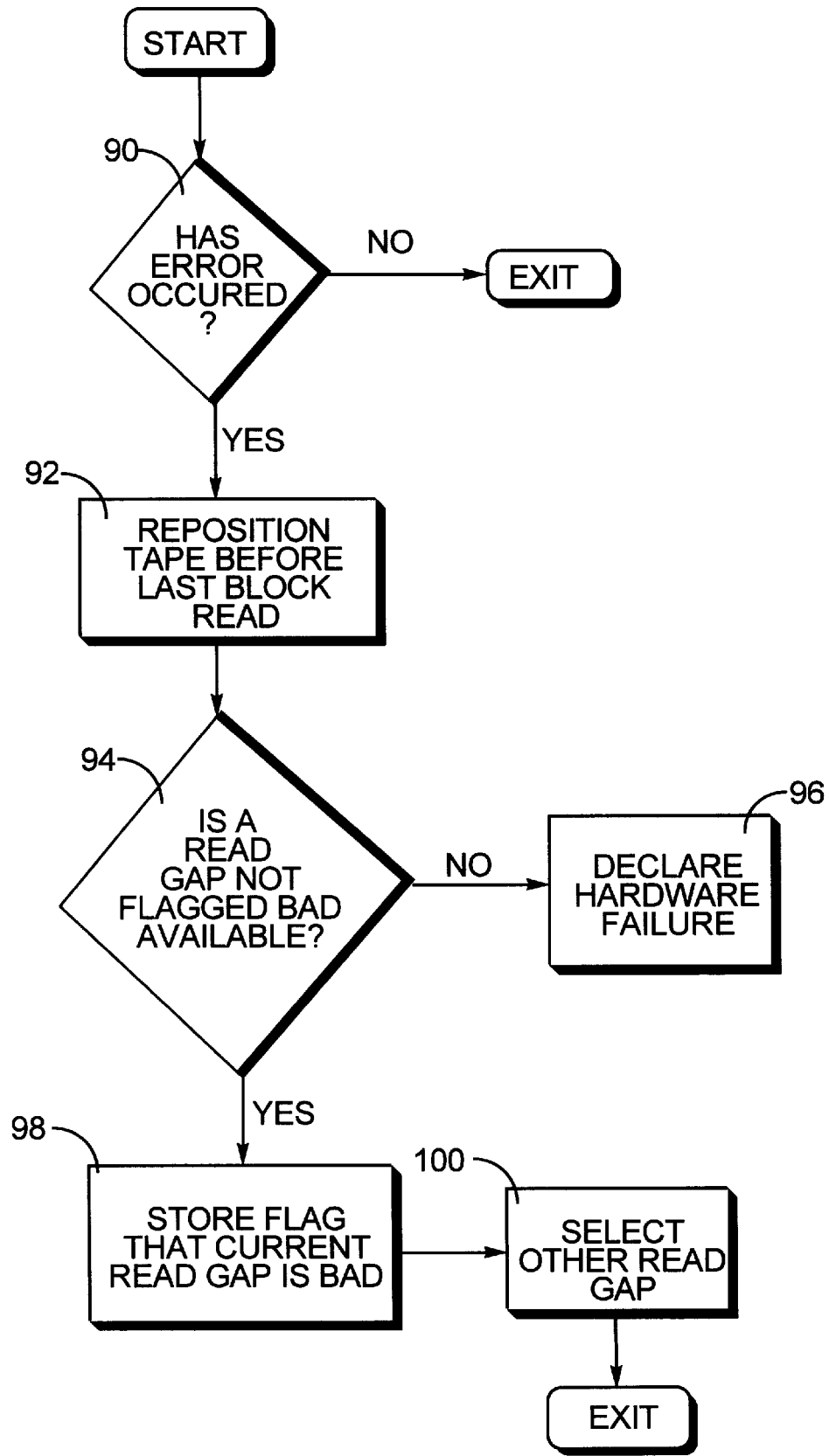
FIG. 4 is a flow chart showing the logical steps for detecting a bad gap and switching gaps in a read mode.

The read mode gap check procedure 40 flow chart is shown in FIG. 4. At block 90 the read signal is checked to determine whether an error has occurred, which happens only after the retry procedure 44 failed to correct any detected error. If an error is detected, the retry procedure 44 is called as discussed above with regard to FIG. 3. If during a select number of retries the error no longer occurs, the procedure is exited. If after the select number of retries the error still occurs, the procedure continues at block 92. At block 92 the driver 42 is called to reposition the tape before the last block of data read. At decision block 94 the memory is searched to determine whether a read gap not flagged bad is available. If no other read gap not flagged bad is available, at block 96 a hardware failure is declared. If another read gap not flagged bad is available, at block 98 a flag that the current read gap is bad is stored in memory. At block 100 the other read gap is selected and the procedure continues by recalling the read procedure 36. The read mode gap check procedure 40 is usable with any hardware embodiment depicted in FIGS. 3–6.

The tape drive of the present invention is intended to normally back up data in a read while write mode. If during a read while write mode of operation with the tape moving in the direction of the first arrow 56 a gap error is detected and the first write gap 14 is determined to be bad, a bad write gap error is stored in memory and the second write gap 18 continues a back up operation by writing data in a write only mode. Likewise, if the device is restoring data in the read mode with the tape moving in the direction of the arrow 56, when the first read gap 16 is determined to be bad, a bad gap flag is stored and the second read gap 20 is actuated. In the embodiment illustrated in FIG. 2, there is no switch in gaps per se, but as explained above, the read or write operation can be continued by the non-failing head in a manner similar to the embodiment illustrated in FIG. 1 and as discussed above. In the three gap embodiments of FIGS. 5 and 6, there is also redundancy with regard to either a read or write gap.

The storage device of the present invention enables a back up or restore operation to be continued virtually instantaneously notwithstanding failure of a currently used read or write gap. This represents a significant advance over prior storage devices which, upon failure of a currently used read or write gap, would declare a hardware failure and halt a back up or restore operation. This required immediate replacement or repair of the back up or restore device before a back up or restore operation could be completed. Not only could this result in a significant inconvenience to an operator, it could also lead to failure to meet back up guidelines and potentially a loss of valuable data before a replacement storage device could be located and installed. These significant advantages can be realized for nominal additional cost over conventional storage devices having a pair of read and write gaps for each direction of tape movement.

What is claimed is:

1. A magnetic storage device for storing data to and retrieving data from a longitudinal track of a magnetic medium comprising:
    a first write gap, a first read gap and at least one of a second write gap and a second read gap, each gap being operatively associated with a longitudinal track of a magnetic medium, spaced longitudinally relative to the longitudinal track of the magnetic medium and aligned in substantially a single longitudinal plane corresponding to a longitudinal track of a magnetic medium;
    a controller coupled to each gap, the controller sensing a bad gap; and
    the controller, in response to sensing a bad gap, storing a flag designating the gap as bad and switching to another gap not flagged bad, if available, for performing the function.

2. The magnetic storage device of claim 1 wherein all the gaps are contained in a single head.

3. The magnetic storage device of claim 1 wherein the magnetic medium is a multi-track magnetic tape and each gap is operatively associated with a same select track of the multi-track magnetic tape.

4. The magnetic storage device of claim 1 having first and second write gaps and a read gap, the magnetic storage device being normally operable in a read while write mode during storage of data, wherein in a first direction of the magnetic medium the first write gap writes data and the read gap reads the just written data and in a second direction of the magnetic medium the second write gap writes data and the read gap reads the just written data and when the controller senses a bad write gap, the current write gap is flagged bad, the controller switches to the other write gap and the controller switches to a write only mode.

5. The magnetic storage device of claim 4 wherein when the controller senses a bad read gap, a hardware failure is declared.

6. The magnetic storage device of claim 1 having first and second read gaps and a write gap, the magnetic storage device being normally operable in a read while write mode during storage of data, wherein in a first direction of the magnetic medium the write gap writes data and the second read gap reads the just written data and in a second direction of the magnetic medium the write gap writes data and the first read gap reads the just written data and when the controller senses a bad read gap, the current gap is flagged bad, the controller switches to the other read gap and the controller switches to a write only mode.

7. The magnetic storage device of claim 6 wherein the controller senses a bad write gap, a hardware failure is declared.

8. The magnetic storage device of claim 1 having a first write gap, a first read gap, a second write gap and a second read gap.

9. The magnetic storage device of claim 8 normally operable in a read while write mode during storage of data, wherein in a first direction of the magnetic medium the first write gap writes data and the first read gap reads the just written data and in a second direction of the magnetic medium the second write gap writes data and the second read gap reads the just written data and when the controller senses a bad write gap, the current write gap is flagged bad and the controller switches to the other write gap.

10. The magnetic storage device of claim 9 wherein when the controller switches to the other write gap it also switches to a write only mode.

11. The magnetic storage device of claim 10 wherein after the controller switches to a write only mode, data is written to the magnetic medium and following completion of writing of data the data is read to verify the written data.

12. The magnetic storage device of claim 9 wherein the controller senses an error from a gap, stores an error flag, causes a reread of a last written block of data upon sensing of an error and a bad read gap error is sensed if the last written data cannot be reread.

13. The magnetic storage device of claim 12 wherein the controller causes a rewrite of the block of just written data if a bad write gap error is sensed.

14. The magnetic storage device of claim 9 wherein when the current read gap is flagged bad the controller switches to a write only mode.

15. The magnetic storage device of claim 14 wherein after the controller switches to a write only mode data is written to the magnetic medium and following completion of writing of data the data is read to verify the written data.

16. The magnetic storage device of claim 8 wherein during a read operation, when a bad read gap is sensed and the other read gap has been flagged bad, the controller generates a hardware failure message.

17. The magnetic storage device of claim 9 wherein when a usable read gap does not follow the other write gap, the controller switches to a write only mode.

18. The magnetic storage device of claim 9 wherein when a usable read gap does not follow the current write gap, the controller switches to a write only mode.

19. A method of operating a magnetic storage device having a first write gap, a first read gap and a second read gap with each gap being spaced longitudinally and aligned in substantially a single longitudinal plane corresponding to a track of a magnetic media, the method comprising the steps of:
   a. selecting a mode of operation;
   b. determining when a gap used for the selected mode of operation is bad flagging said bad gap;
   c. when the mode of operation is a read mode, determining if an alternate read gap in the single longitudinal plane that has not been flagged bad is available;
   d. when an alternate read gap in the single longitudinal plane that has not been flagged bad is available;
   e. switching from the current read gap to said alternate read gap in the single longitudinal plane not flagged bad.

20. The method of claim 19 further comprising:
   f. when in step c. no read gap that has not been flagged bad is available, declaring a hardware failure.

21. The method of claim 19 further comprising:
   f. when the mode of operation is a read while write mode, determining which of a current write gap and a current read gap is bad; and
   g. flagging the current bad gap.

22. The method of claim 21 further comprising:
   h. when the current read gap is bad, switching to a write only mode.

23. The method of claim 21 wherein the magnetic storage device includes a second write gap, the method further comprising:
   h. when the current write gap is bad, switching to an alternate write gap.

24. The method of claim 21 further comprising:
   h. switching to a write only mode when a usable read gap does not follow a usable write gap.

25. The method of claim 19 further comprising:
   f. when the mode of operation is a read while write mode, determining whether the last written block of data can be reread; and
   g. when the last written block of data cannot be reread, flagging the current read gap as bad.

26. The method of claim 25 wherein the magnetic storage device includes a second write gap, the method further comprising:
   h. when the last written block of data can be reread, flagging the current write head as bad, repositioning the magnetic medium before the block of last written data, switching from the current write gap to an alternate write gap and continuing writing data.

27. The method of claim 26 wherein step h. further comprises switching to a write only mode.

28. A computer-readable storage medium containing computer-readable instructions that when executed by a computer connected to a magnetic storage tape drive having a first write gap, a first read gap and at least one of a second write gap and a second read gap with each gap being spaced longitudinally and aligned in substantially a single longitudinal plane corresponding to a track of a magnetic media, causes the computer to perform the steps comprising:
   a. selecting a mode of operation;
   b. when the mode of operation is a read while write mode, determining if a current write gap or a current read gap in the single longitudinal plane is bad;
   c. flagging the gap determined to be bad as the current bad gap; and
   d. switching to another gap in the single longitudinal plane not flagged bad, if available, for performing the function of the bad gap.

29. The computer readable storage medium performing the steps of claim 28 further comprising:
   e. when the current read gap is flagged bad, switching to a write only mode.

30. The computer-readable storage medium for causing the computer to perform the steps of claim 28 further comprising:
   f. when the current write gap is flagged bad, switching to a write only mode.

31. A tape storage device for storing and retrieving data from a select longitudinal track of a magnetic medium comprising:
   a first read/write head and a second read/write head longitudinally spaced in substantially a single longitudinal plane corresponding to a select longitudinal track of a magnetic medium with the first read/write head receiving a write electric signal and in response to the write electric signal writing data by producing flux changes in the select track when the magnetic medium is moved in a first direction and the second read/write head reading data by sensing flux changes along the first direction of the magnetic medium during a read while write mode of operation and producing a read electric signal in response to the flux changes and the first and second read/write heads switching read and write functions when the medium is moved in a second direction;

a controller electrically coupled to each of the first and second read/write heads, the controller, detecting an error in the read electric signal, repositioning the magnetic medium before a last known block of written data, producing a read error if the last known block of written data cannot be reread; and in response to a read error, putting the device in a write only mode.

32. The tape storage device of claim 31 wherein the controller produces a write error signal if the last known block of written data can be reread; and in response to the write error signal, putting the device in a write only mode, switching the write function from a current read/write head writing data to the other read/write head.

* * * * *